July 7, 1925.  1,544,850

G. L. R. J. MESSIER

PNEUMATIC RESILIENT SHOCK ABSORBER

Original Filed April 3, 1920

*Inventor:*
GEORGE LOUIS RENÉ JEAN MESSIER per

*Attorneys.*

Patented July 7, 1925.

1,544,850

UNITED STATES PATENT OFFICE.

GEORGE LOUIS RENÉ JEAN MESSIER, OF MONTROUGE, FRANCE.

PNEUMATIC RESILIENT SHOCK ABSORBER.

Original application filed April 3, 1920, Serial No. 371,104. Divided and this application filed March 1, 1922. Serial No. 540,164.

*To all whom it may concern:*

Be it known that I, GEORGE LOUIS RENÉ JEAN MESSIER, engineer, of 29 Avenue Leon Gambetta, Montrouge, Seine, France, have invented Improvements in Pneumatic Resilient Shock Absorbers, of which the following is a full, clear, and exact description.

This invention has for its object an improvement in pneumatic resilient shock absorbers for motor vehicles or the like and is a division of the United States patent application filed on the 3rd April, 1920, Serial No. 371104, which became Patent No. 1,486,911 on March 18, 1924.

Pneumatic resilient shock absorbers have already been proposed, which are constituted by a piston movable in a cylinder containing compressed air, and in which the quantity of air forming an elastic cushion between the bottom of the cylinder and the piston is controlled, on the one hand by a compressed air inlet valve, provided with a stem entering within the cylinder and upon which the piston acts above a determined position of its upward stroke and, on the other hand, by an exhaust port, opening in the atmosphere and uncovered by the piston at a determined position of its downward stroke.

In these apparatuses the lubrication and fluid-tightness of the piston are defective, as the oil introduced in the cylinder for the lubrication escapes in the atmosphere through the exhaust port at the time the latter is uncovered by the piston.

The improvement forming the subject-matter of the present invention is adapted to remedy this inconvenience.

This improvement consists subsantially in the application of a device providing a circulation in a closed circuit of the air and oil, so as to automatically ensure the return, within the cylinder of the lubricating oil drawn along by the air when it issues through the exhaust port.

The present improvement will be described hereafter as applied to the suspension of a vehicle, with reference to the accompanying drawing, in which.

Figure 2:
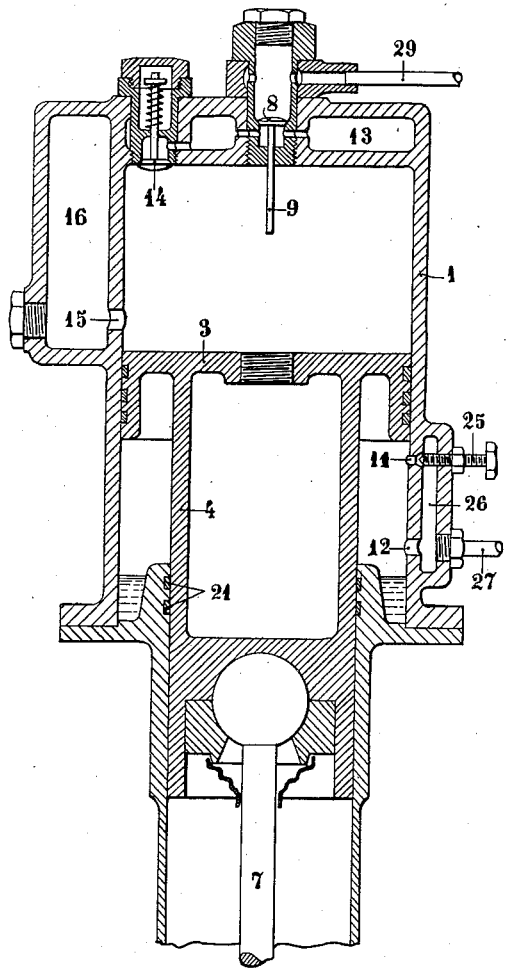
Fig. 2 is a detail view, on an enlarged scale, showing a shock absorber in vertical section.
Figure 1:
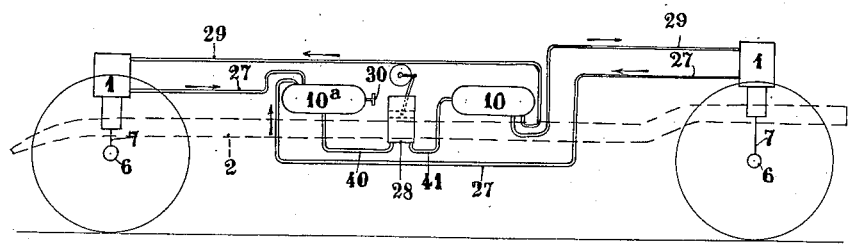
Fig. 1 is a diagrammatic view of the device.

As shown in the drawing, the suspension device comprises at each axle end a cylinder 1, secured to the frame 2 of the vehicle, by any means whatever, and in which moves a piston 3 connected to the axle 6 by a link 7.

This cylinder is provided at its upper part with an intermediate inlet chamber 13; the latter can be placed in communication, on the one hand, with a compressed air reservoir 10 through a piping 29 by means of a valve 8 the stem 9 of which extends within the cylinder 1 and, on the other hand, with the interior of the cylinder by means of a valve 14 opening towards the interior of the cylinder and preventing the reflux of the air from the said cylinder into the chamber 13 and piping 29.

When the piston 3 comes near to the upper head of the cylinder and raises the valve 8, the compressed air fed by the piping 29 enters into the chamber 13 and then, by pushing back the valve 14, into the cylinder 1; when the piston moves down, the valve 8 closes and the communication between the chamber 13 and the compressed air reservoir 10 is cut off.

By means of the interposition of this chamber 13 no direct communication between the interior of the cylinder 1 and the compressed air reservoir 10 can ever take place. No possible issue is thus offered to the air of the cylinder in case this air should reach a pressure greater than that of the air of this reservoir 10 and, consequently, no shock of the piston against the top of the cylinder can ever take place.

The wall of the cylinder 1 is perforated with an orifice 15 which puts this cylinder in communication with the lower part of an auxiliary chamber 16.

This auxiliary chamber 16 is adapted to increase the resiliency of the suspension, as long as the displacements of the piston above and below its mean position are of but small amplitude by diminishing the variation of the pressure for a given displacement of the piston.

When the piston 3, during its new upward movement, covers the orifice 15, the chamber 16 no longer plays any part, so that the pressure of the air contained in the cylinder 1 can increase rather rapidly and brake the upward movement of the piston; the suspension thus becomes progressively less resilient at the ends of the strokes.

Moreover, it is to be noted that owing to the communication of the lower part of the chamber 16 with the cylinder, no accumulation of lubricating oil in this auxiliary chamber 16 can ever take place, as the oil driven in the latter by the piston comes back in the cylinder through the orifice 15, at the time the latter is uncovered by the piston; it results therefrom that the proper working of this auxiliary chamber is always ensured.

In the wall of the cylinder 1 are, moreover, provided at suitable levels, two ducts 11 and 12 opening in a chamber 26; the cross-section of the orifice 11 is adjustable at will by means of a needle-screw 25.

The exhaust chambers 26 of the shock absorbers mounted at the ends of the two axles 6 are each connected by a piping 27 to the upper part of a common reservoir 10ª communicating with the atmosphere through an orifice 30 constantly open; from the lower part of this reservoir 10ª extends a pipe 40 leading to the suction of a compressing apparatus, for instance a sucking and forcing pump 28, the delivery of which is connected by a pipe 41 to the reservoir 10 which has no communication with the atmosphere; from the lower part of this reservoir 10 extend the pipes 29 for feeding compressed air to each shock absorber.

By means of this device, the oil drawn along with the air issuing from the orifice 11 of each shock absorber is brought back by this air in the reservoir 10ª. The pump 28 sucks the air and oil contained in the latter and delivers them in the reservoir 10, within which the air is thus compressed.

The air and oil thus recuperated in the reservoir 10 come back (the oil being drawn along with the air under pressure) to the cylinder 1 of each shock absorber through the pipes 29, when the valve 8 is raised by the piston 3.

This constant circulation of the air and oil in a closed circuit offers the main following advantages:

1. Owing to the constant feeding of oil in each cylinder 1 a film of lubricant remains permanently on the piston and ensures a perfect tightness of the latter, preventing any passage of air; the pressure can therefore never diminish within the cylinders of the shock absorbers. Owing to the proper working which is thus always ensured, the present device allows to do away with the suspension springs.

2. No loss of oil can ever occur.

3. No introduction of dust or dirt within the cylinder 1 can ever take place.

Finally, notwithstanding the constant feeding of oil, no accumulation of lubricant in the side chamber 16 can ever occur, owing to the communication of the lower part of this side chamber with the cylinder as above stated.

By means of this device it is sufficient for ensuring the lubrication and tightness, to introduce in the reservoir 10ª a small quantity of oil.

In the suspension system which has just been described, the cylinder of each shock absorber is secured to the chassis and the piston is connected to the axle; the position of the parts of this suspension system might be reversed, that is to say, the piston might be integral with the chassis and the cylinder connected to the axle; in this case, the compressed air inlet valve 8, the check valve 14 and the intermediate chamber 13 would be carried by the piston.

The constructional arrangements above described are given by way of example only, the forms, dimensions and details of construction of the various constituent elements may of course be modified.

Claims:

1. A shock absorber for the suspension of vehicles, comprising: a cylinder,—a piston movable therein, and covered with a layer of oil on its upper face—connections between these parts and respectively the axle of the vehicle and the frame of the latter,—means for admitting compressed air into the cylinder starting from a point of the upward stroke of the piston,—an exhaust orifice provided in the wall of the cylinder at such a level that it is uncovered by the upper face of the piston from a point of the down stroke of the latter,—an air compressor,—means for connecting the exhaust of the cylinder to the suction side of this compressor so that the oil drawn along with the air escaping from the cylinder is admitted in the compressor with the air to be compressed,—means for connecting the delivery side of the compressor with the inlet side of the cylinder so that the oil which has been drawn into the compressor is brought back into the cylinder at the same time as the compressed air.

2. A shock absorber for the suspension of vehicles, comprising: a cylinder,—a piston movable therein, connections between these parts and respectively the axle of the vehicle and the frame of the latter,—means for admitting compressed air into the cylinder starting from a point of the upward stroke of the piston,—an exhaust orifice provided in the wall of the cylinder at such a level that it is uncovered by the upper face of the piston from a point of the down stroke of the latter,—an orifice provided in the wall of the cylinder below the said exhaust orifice at such a level that it is never uncovered by the upper face of the piston and that it is closed by the said piston a little time before the end of the down stroke of the latter,— an exhaust chamber in which open these two orifices,—a collecting reservoir in communication with the atmosphere through an orifice provided at a certain distance above its bottom,—a duct connecting the lower part of the exhaust chamber with the said reservoir,—an air compressor,—a duct connecting the suction side of the latter to the lower part of the said collecting reservoir,—a feeding reservoir,—a duct connecting the delivery side of the compressor to the said feeding reservoir,—a duct connecting the lower part of this feeding reservoir to the means for admitting the compressed air in the cylinder.

The foregoing specification of my improvements in pneumatic resilient shock absorbers signed by me this 10th day of February, 1922.

GEORGE LOUIS RENÉ JEAN MESSIER.